No. 782,672. PATENTED FEB. 14, 1905.
J. O. LINDEN.
MILK STRAINER.
APPLICATION FILED SEPT. 2, 1904.
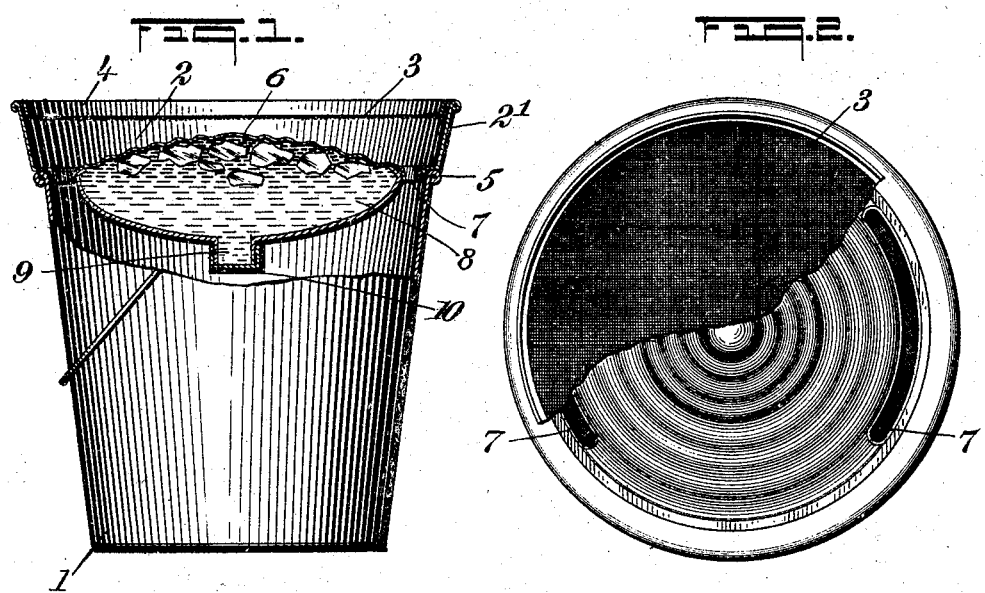
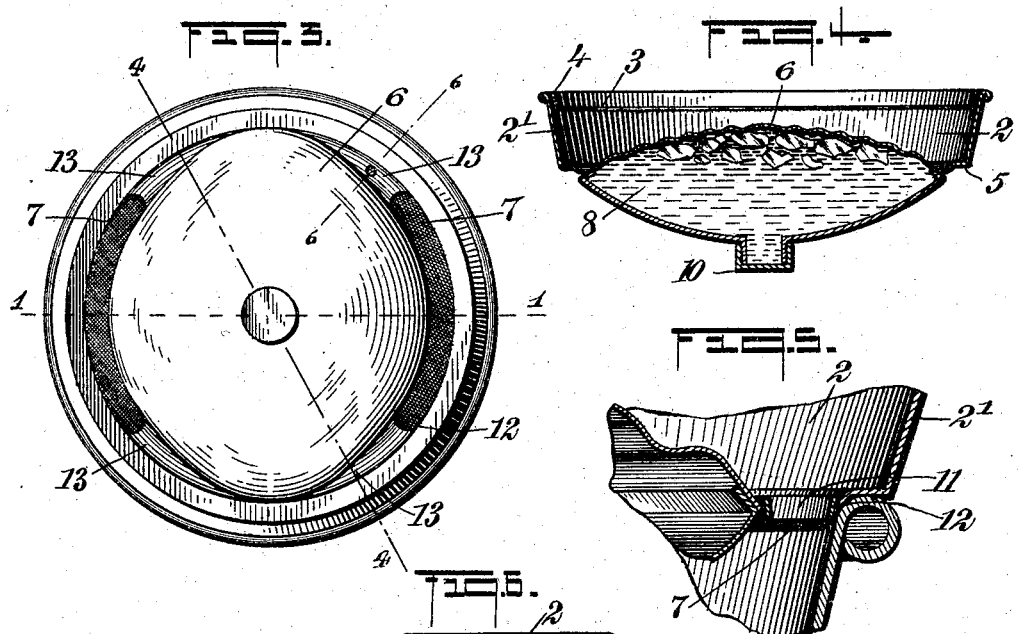
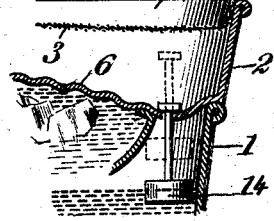
WITNESSES:
INVENTOR
John O. Linden
BY
ATTORNEYS No. 782,672. Patented February 14, 1905.

UNITED STATES PATENT OFFICE.

JOHN O. LINDEN, OF PROPHETSTOWN, ILLINOIS.

MILK-STRAINER.

SPECIFICATION forming part of Letters Patent No. 782,672, dated February 14, 1905.

Application filed September 2, 1904. Serial No. 223,060.

*To all whom it may concern:*

Be it known that I, JOHN O. LINDEN, a citizen of the United States, and a resident of Prophetstown, in the county of Whiteside and State of Illinois, have invented a new and Improved Milk-Strainer, of which the following is a full, clear, and exact description.

The object of my invention is to provide a simple and efficient strainer and cooler for liquids, which is also adapted to act as a cover for a pail or other receptacle.

This strainer is especially adapted for straining milk, cream, &c., and also to effectually and quickly cool the same, thereby removing all of the animal heat and odor from the same.

My invention also includes a novel form of cooling-tank to be used in connection with the strainer.

The invention further consists in the construction and combination of parts to be more fully described hereinafter and definitely set forth in the claims.

Reference is to be had to the accompanying drawings, forming a part of this specification, in which similar characters of reference indicate corresponding parts in all the views.

Figure 1 is a side view of a pail with the strainer applied and showing the strainer in section. Fig. 2 is a plan view with part of the upper screen broken away to show the top of the cooling-tank. Fig. 3 is a plan view of the strainer with the upper screen removed. Fig. 4 is a central section of the strainer and cooling-tank complete, taken on the line 4 4 of Fig. 3. Fig. 5 is a detail of the lower screen and the means for retaining it in place and is a part section on the line 1 1 of Fig. 3, and Fig. 6 is a detail showing a float for indicating the height of the liquid in the pail.

Referring more particularly to the parts, 1 indicates a pail or bucket, and 2 indicates the strainer as a whole applied to the top of the bucket. This strainer consists of an outer rim, which flares outwardly, having secured at the top a screen 3, held in place by a flaring ring 4, adapted to be removed for the purpose of cleaning the same. The ring 4 is held in place by friction. At the bottom of the rim 2' is formed a flange 5, upon which the strainer is adapted to be supported by means of the upper rim of the pail. To this flange is secured a plate 6, which is bulged upwardly in the center, so as to provide an inclined surface upon which the milk is directed to the lower screens 7 7. This plate is preferably corrugated, as shown in Figs. 1 and 2, so as to retard the milk in its flow toward the screens 7 7, thereby keeping it in contact with the plate 6 a sufficient length of time to effectually cool the same. This plate 6 is made a part of a tank 8, adapted to contain a cooling liquid, such as water near the freezing-point, with pieces of ice contained therein, or any other substance having the same properties. The bottom of the tank 8 is formed with an opening 9, which is closed by means of a screw-cap 10.

The screens 7 7, located on opposite sides of the cooling-tank, as shown in Fig. 3, are secured in a manner similar to the screen 3— that is, by means of a flaring piece 11 of substantially the size of an opening 12—and held therein by friction. The material of the screens 7 7 is preferably cloth or similar material. They may, however, be made of ordinary wire screening. The upper screen 3 is preferably formed of wire, but may also be made of other foraminous material.

Integral with the flange 5 are inclined surfaces 13, which are adapted to direct the liquid to the lower screens 7 7.

In order to indicate when the pail is nearly full of liquid, a float 14 is provided, as shown in Fig. 6. This may be made of any material which has sufficient buoyancy to lift it when immersed in the liquid, such as cork, a hollow tin bulb, or the like.

From this description it will be seen that when the strainer is in place upon the bucket it will also act as a cover to effectually exclude dust, dirt, &c.

The operation of the device is as follows: The strainer is reversed and the cooling-tank 8 is filled with the cooling liquid. The strainer is then turned right side up and placed in position upon the pail or receptacle and the liquid is poured through the upper screen 3, directing it as near as possible upon the center of the plate 6, whereupon it will flow slowly over the inclined corrugated surface of said plate, thereby imparting its heat to the cooling liquid. After leaving this inclined surface it is directed to the screens 7 7, and the dust and other foreign substance which has not been removed by the first screen is here separated from the liquid, which is thus directed into the receptacle.

The cooling of the milk or cream immediately after being taken from the animal has the effect of prolonging the time for which it can be kept before turning sour and becoming unfit for use for many purposes.

Having thus described my invention, I claim as new and desire to secure by Letters Patent—

1. A strainer, comprising a rim having an inwardly-projecting flange at its lower end, a strainer in the rim, an upwardly-inclined corrugated plate secured to the flange, said plate being provided at its margin with elongated openings, screens in said openings, and a cooling-tank below the corrugated plate, the top of which is formed by the said corrugated plate.

2. A strainer, comprising a rim having an inwardly-projecting flange at its lower end, a strainer in the rim, a cooling-tank having an upwardly-inclined top and secured to the flange of the rim, elongated openings being formed at the opposite sides of the top of the tank at the lower edges thereof, and screens in said openings.

3. A strainer, comprising a rim, a strainer in the rim, a cooling-tank supported in the lower end of the rim and having an upwardly-inclined and corrugated top, and screens arranged between the periphery of the cooling-tank and the inner surface of the rim at opposite sides of the tank.

4. A strainer, comprising a rim, a strainer in the rim, a cooling-tank supported by the rim at the lower end thereof and having an upwardly-inclined top, and screens arranged between the periphery of the tank and the inner surface of the rim.

5. In a milk-strainer, the combination of a rim, a screen in said rim, an outwardly-inclined cooling-surface secured to the rim beneath said screen, and a second screen removably secured at the base of said cooling-surface, substantially as described.

6. In a milk-strainer, the combination of an outer support, a screen removably mounted in said support, an outwardly-inclined cooling-surface beneath said screen, and a second screen removably mounted at the base of said cooling-surface, substantially as described.

7. In a strainer, the combination of a rim, a cooling-tank carried by the rim and having an upwardly-inclined top, said tank being spaced from the rim at opposite sides, and removable screens in the spaces between the tank and sides of the rim.

8. In a strainer, the combination of a rim, a cooling-tank carried by the rim and having an upwardly-inclined top, said tank being spaced from the rim at opposite sides, screens in the spaces between the tank and rim, and means for removably securing the screens in position.

9. In a strainer, a circular rim, a cooling-tank carried by the rim and having an upwardly-inclined top, said tank being substantially oval in shape, whereby the tank will be spaced from the rim at opposite sides, and screens arranged in the spaces between opposite sides of the tank and rim.

10. In a strainer, a circular rim having an inwardly-extending flange at its lower end, the flange being provided with oppositely-arranged openings, a cooling-tank substantially oval in shape and secured to the flange of the rim, whereby the tank will be spaced from the rim at opposite sides, the tank having a corrugated and upwardly-inclined top, and screens at opposite sides of the tank in the openings of the flange of the rim.

In testimony whereof I have signed my name to this specification in the presence of two subscribing witnesses.

JOHN O. LINDEN.

Witnesses:
W. H. MATTHEWS,
GRACE E. MATTHEWS.